US008393062B2

(12) United States Patent
Alexander

(10) Patent No.: US 8,393,062 B2
(45) Date of Patent: Mar. 12, 2013

(54) SYSTEMS AND METHODS FOR POSITIONING FAIRING SHEATHS OF GAS TURBINE ENGINES

(75) Inventor: Phillip Alexander, Colchester, CT (US)

(73) Assignee: United Technologies Corp., Hartford, CT (US)

( * ) Notice: Subject to any disclaimer, the term of this patent is extended or adjusted under 35 U.S.C. 154(b) by 1276 days.

(21) Appl. No.: 12/059,235

(22) Filed: Mar. 31, 2008

(65) Prior Publication Data

US 2009/0243176 A1 Oct. 1, 2009

(51) Int. Cl.

| | |
|---|---|
| ***B21D 53/46*** | (2006.01) |
| ***B23P 17/00*** | (2006.01) |
| ***B23B 3/16*** | (2006.01) |
| ***B23B 7/04*** | (2006.01) |
| *B25B 5/04* | (2006.01) |

(52) U.S. Cl. ....................................... 29/21; 29/3; 29/45

(58) Field of Classification Search .................... 269/21, 269/3, 96, 45

See application file for complete search history.

(56) References Cited

U.S. PATENT DOCUMENTS

| | | | | |
|---|---|---|---|---|
| 4,119,863 | A * | 10/1978 | Kelly | 290/55 |
| 4,993,918 | A | 2/1991 | Myers et al. | |
| 5,020,318 | A | 6/1991 | Vdoviak | |
| 5,272,869 | A | 12/1993 | Dawson et al. | |
| 5,704,599 | A * | 1/1998 | Slothower | 269/21 |
| 5,992,836 | A * | 11/1999 | Howe | 269/41 |
| 6,401,646 | B1 | 6/2002 | Masters et al. | |
| 6,792,758 | B2 | 9/2004 | Dowman | |
| 6,799,756 | B2 * | 10/2004 | Degen | 269/96 |
| 6,983,608 | B2 | 1/2006 | Allen, Jr. et al. | |
| 7,100,358 | B2 | 9/2006 | Gekht et al. | |
| 7,118,331 | B2 | 10/2006 | Shahpar | |
| 7,137,255 | B2 | 11/2006 | Schmotolocha et al. | |
| 7,431,189 | B2 * | 10/2008 | Shelton et al. | 227/176.1 |
| 7,448,525 | B2 * | 11/2008 | Shelton et al. | 227/176.1 |
| 2006/0260127 | A1 | 11/2006 | Gekht et al. | |
| 2007/0162056 | A1 * | 7/2007 | Gerbi et al. | 606/153 |
| 2008/0029573 | A1 * | 2/2008 | Shelton et al. | 227/175.2 |
| 2008/0029574 | A1 * | 2/2008 | Shelton et al. | 227/175.2 |
| 2008/0232953 | A1 * | 9/2008 | Guimbard et al. | 415/110 |
| 2008/0296346 | A1 * | 12/2008 | Shelton et al. | 227/180.1 |
| 2008/0300580 | A1 * | 12/2008 | Shelton et al. | 606/1 |
| 2010/0224669 | A1 * | 9/2010 | Shelton et al. | 227/176.1 |

* cited by examiner

*Primary Examiner* — Lee D Wilson
*Assistant Examiner* — Alvin Grant

(57) ABSTRACT

Systems and methods for positioning fairing sheaths are provided. In this regard, a representative method includes using vacuum pressure to assist in moving opposing portions of a fairing sheath away from each other.

20 Claims, 3 Drawing Sheets

SYSTEMS AND METHODS FOR POSITIONING FAIRING SHEATHS OF GAS TURBINE ENGINES

STATEMENT REGARDING FEDERALLY SPONSORED RESEARCH AND DEVELOPMENT

The U.S. Government may have an interest in the subject matter of this disclosure as provided for by the terms of contract number N00019-02-C-3003 awarded by the United States Navy.

BACKGROUND

1. Technical Field

The disclosure generally relates to gas turbine engines.

2. Description of the Related Art

A gas turbine engine typically includes an annular gas path that generally extends between an inlet and an exhaust. The structure used to define the gas path is oftentimes supported by struts and/or fairings that extend across the gas path, with corresponding ends of the struts and/or fairings typically supporting one or more rotating shafts of the engine and the opposing ends supporting the engine casing.

SUMMARY

Systems and methods for positioning fairing sheaths of gas turbine engines are provided. In this regard, an exemplary embodiment of a system for positioning a fairing sheath of a gas turbine engine comprises: a tool having a clamp and opposing gripping members; the clamp being operative to clamp about a leading edge portion of a fairing sheath; the gripping members being pivotally attached to the clamp, a first of the gripping members having a first contact face and a first seal positioned on the first contact face, a second of the gripping members having a second contact face and a second seal positioned on the second contact face, the first contact face opposing the second contact face, the first contact face and the first seal being operative to form a first vacuum chamber, the second contact face and the second seal being operative to form a second vacuum chamber.

An exemplary embodiment of a method for positioning a fairing sheath of a gas turbine engine comprising: using vacuum pressure to assist in moving opposing portions of a fairing sheath away from each other.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods for positioning fairing sheaths of gas turbine engines are provided, several exemplary embodiments of which will be described in detail. In this regard, fairing sheaths form portions of the exterior surfaces of gas turbine engine struts that extend across gas paths of the engines. Removal and/or installation of such a fairing sheath typically involve deforming the fairing sheath. Notably, the deformation should be accomplished in a manner that provides sufficient clearance for permitting positioning about adjacent components, while preventing damage to the fairing sheath. In some embodiments, a tool is provided that uses vacuum pressure to facilitate gripping the exterior of the fairing sheath in order to perform the deformation.

Figure 1:
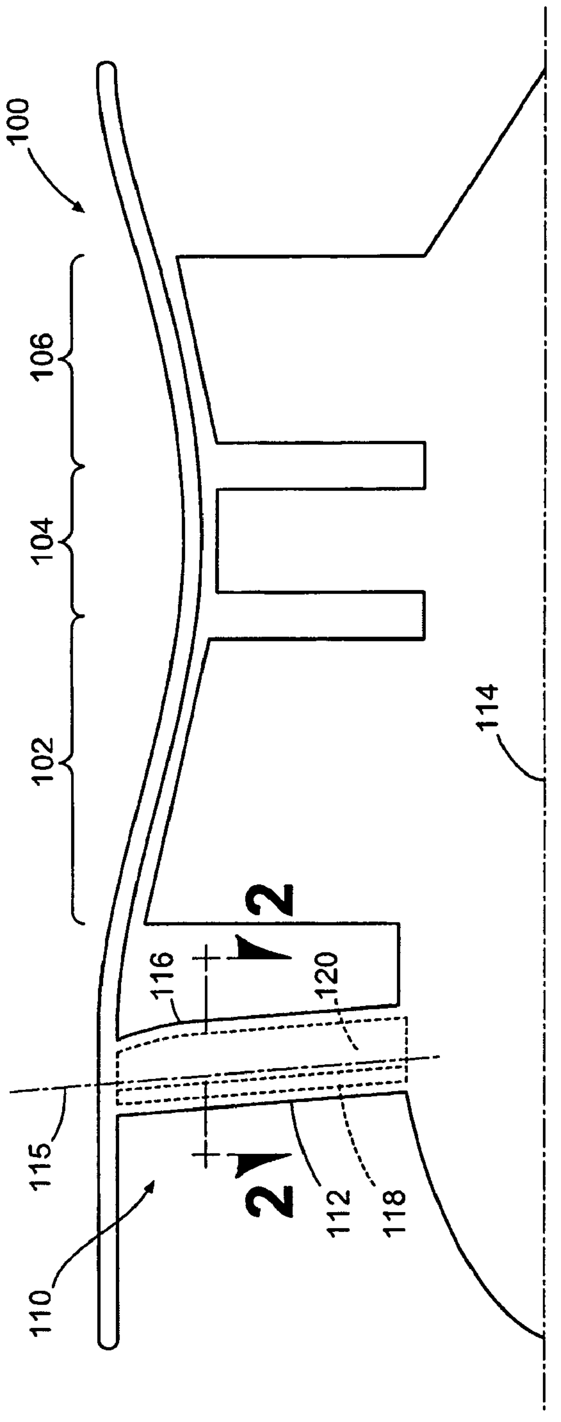
FIG. 1 is a schematic diagram depicting an exemplary embodiment of a gas turbine engine.

FIG. 1 is a schematic diagram that depicts an exemplary embodiment of a gas turbine engine. As shown in FIG. 1, engine 100 is a turbojet that incorporates a compressor section 102, a combustion section 104 and a turbine section 106. Additionally, a strut assembly 110 (in this case, an inlet case strut assembly) is positioned upstream of the compressor section. Although depicted as a turbojet gas turbine engine, it should be understood that the concepts described herein are not limited to use with turbojets as the teachings may be applied to other types of gas turbine engines.

Inlet case strut assembly 110 includes multiple struts 112 that extend about an axis 114. Note that strut 112 includes a longitudinal axis 115 that is generally parallel to the leading edge of the strut. As will be described in more detail with respect to FIG. 2, strut 112 includes a fairing sheath 116, and a locating component 118 which are adhesively bonded to an inner strut 120. Generally, the locating component 118 is integrally manufactured into the fairing sheath 116 forming a subassembly which is secondarily bonded to the inner strut.

Figure 2:
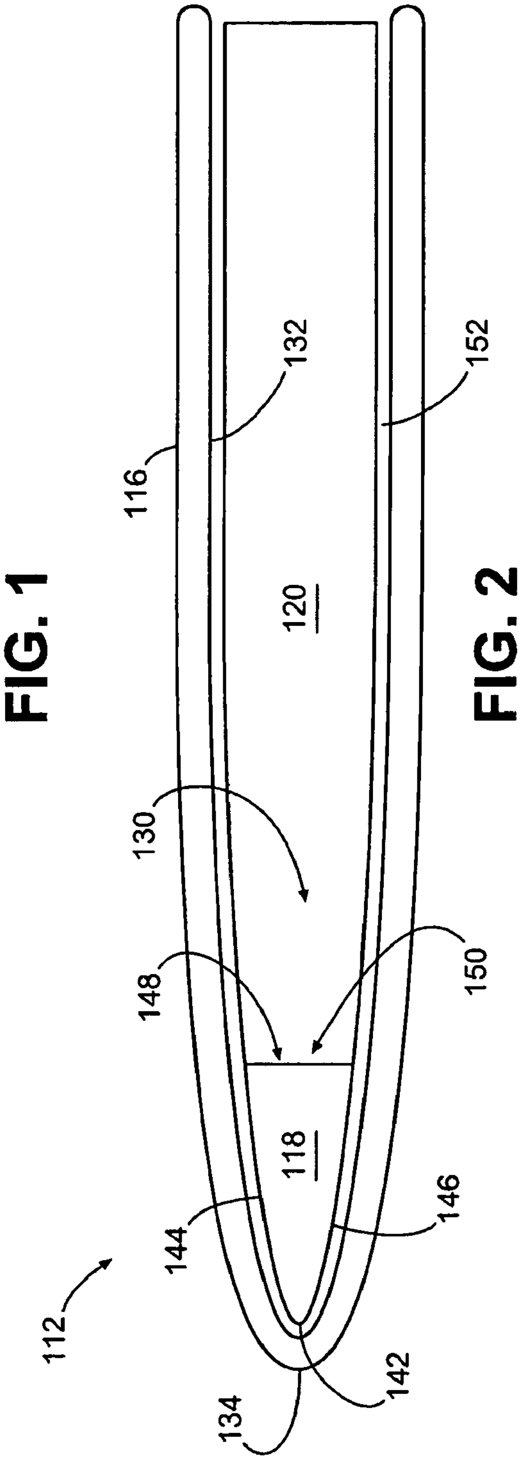
FIG. 2 is a cross-sectional, schematic diagram depicting the inlet fairing of FIG. 1, as viewed along section line 2-2.

As shown in FIG. 2, locating component 118 is positioned between fairing sheath 116 and strut 120. Specifically, the locating component is positioned in a channel 130 formed by the interior surface 132 of the fairing sheath in a vicinity of the leading edge 134 of the fairing sheath. Locating component 118 is generally wedge-shaped in cross-sectional view, and incorporates a leading edge 142, sides 144, 146 extending from the leading edge, and an aft portion 148.

In the embodiment of FIG. 2, a leading edge portion 150 of strut 120 contacts aft portion 148 to establish a desired orientation of the strut and fairing sheath. Notably, contact between the strut and the locating component sets a desired axial spacing between the interior surface 132 of the fairing sheath and the strut, particularly in a vicinity of leading edge 134. Additionally, the sides 144, 146 of the locating component function as guides for the fairing sheath as the sheath extends aft from the leading edge and about at least a portion of the strut. Adhesive 152 is used at various locations between the fairing sheath and the strut in order to fix the relative positions of the components.

Various materials can be used to form a fairing sheath. By way of example, composite materials such as carbon, glass, aramid, or similar materials can be used. In the embodiment of FIGS. 1 and 2, structural fiberglass is used to form the fairing sheath and silicone is used to adhere the fairing sheath to the inner strut.

Figure 3:
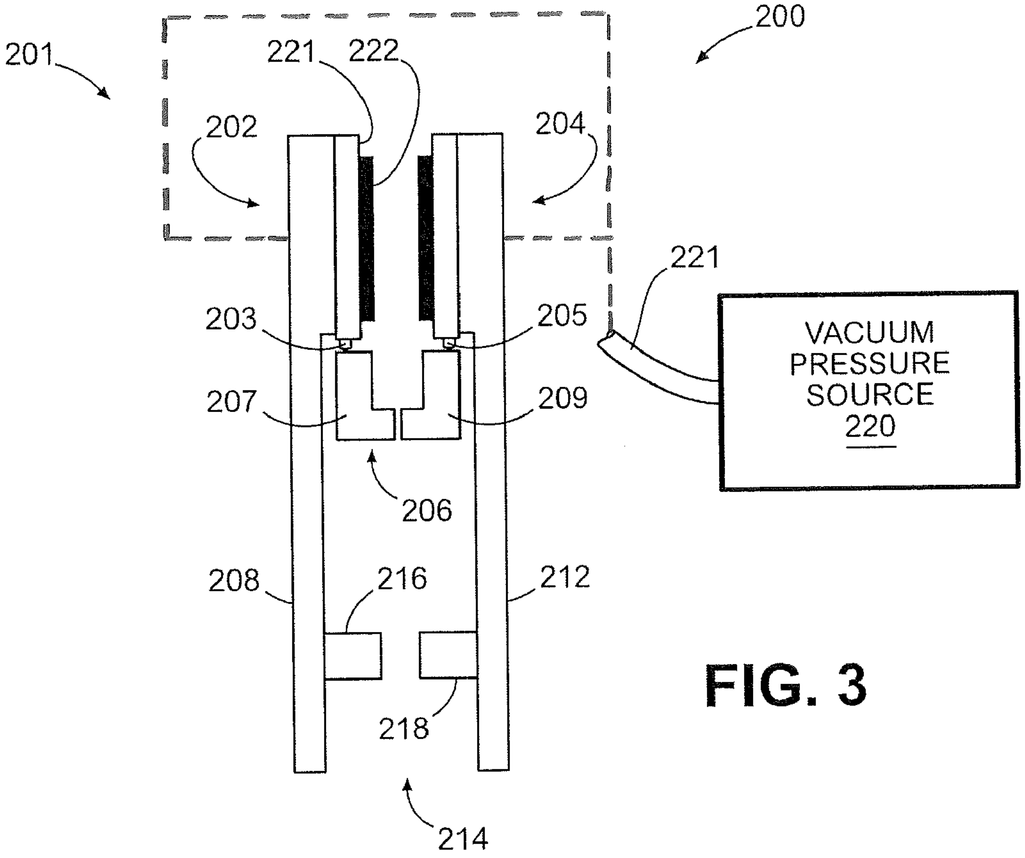
FIG. 3 is a schematic diagram depicting an exemplary embodiment of a fairing tool used for positioning a fairing sheath.
Figure 4:
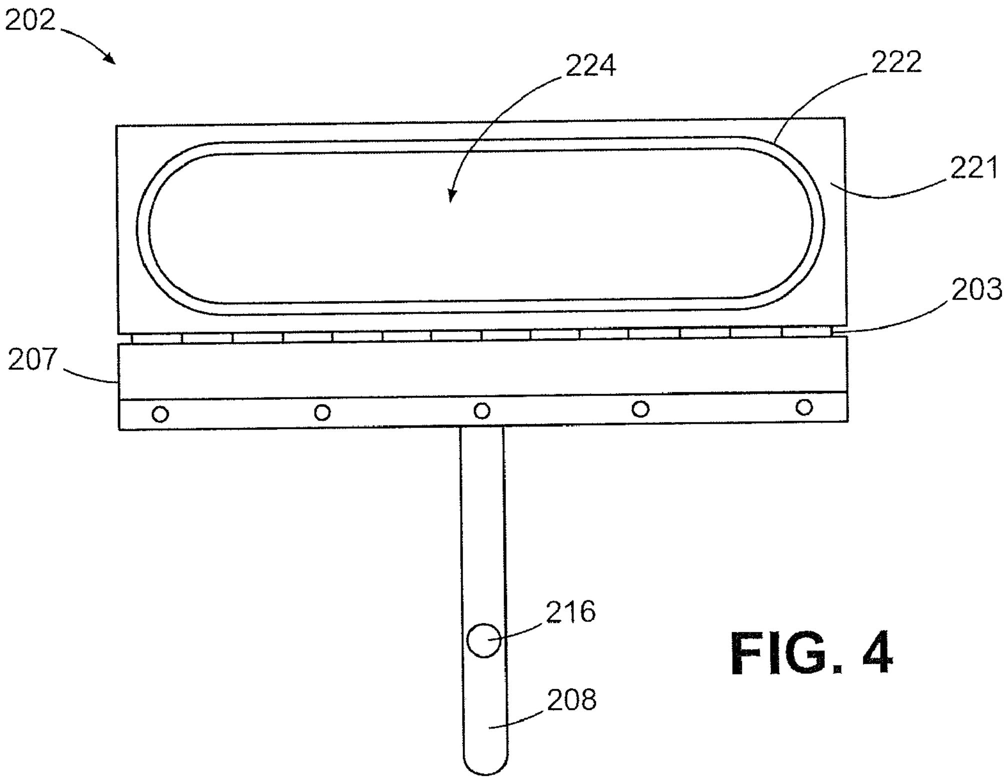
FIG. 4 is a schematic diagram depicting a gripping member and handle of the embodiment of FIG. 3.

An embodiment of a system for positioning a fairing sheath is depicted schematically in FIGS. 3 and 4. As shown in FIG. 3, system 200 incorporates a tool 201 that includes opposing gripping members 202 and 204 that are pivotally mounted to a clamp 206. In this embodiment, hinges 203, 205 facilitate pivoting of the gripping members relative to the clamp. Clamp 206 includes clamp members 207 and 209, with gripping member 202 being attached to clamp member 207, and gripping member 204 being attached to clamp member 209.

A handle 208 extends from gripping member 202 and a handle 212 extends from gripping member 204. A mechanical stop 214 is located between the handles. Specifically, a stop member 216 is positioned on handle 202 and a stop member 218 is positioned on handle 204 in this embodiment. Additionally, a vacuum pressure source 220 provides vacuum pressure to the gripping members, such as via pneumatic line 221.

Each of the gripping members includes a contact face with a corresponding seal that is used to create an airtight (vacuum) seal between the gripping member and an exterior surface of a fairing sheath. In particular, gripping member 202 includes a contact face 221 with a seal 222. Seal 222 is used to create a vacuum chamber 224 that can provide adequate suction for gripping the exterior surface of a fairing sheath. For instance, in some embodiments, a suction force of approximately 120 lbf can be applied. Notably, the major axis of the seal generally corresponds to the length of the fairing sheath to ensure adequate distribution of the pressure forces along the length of the fairing sheath. The use of vacuum, versus mechanical type grips, mitigates the potential for damage to the fairing sheath by distributing the opening force and providing a soft interface via the vacuum seal.

Figure 5:
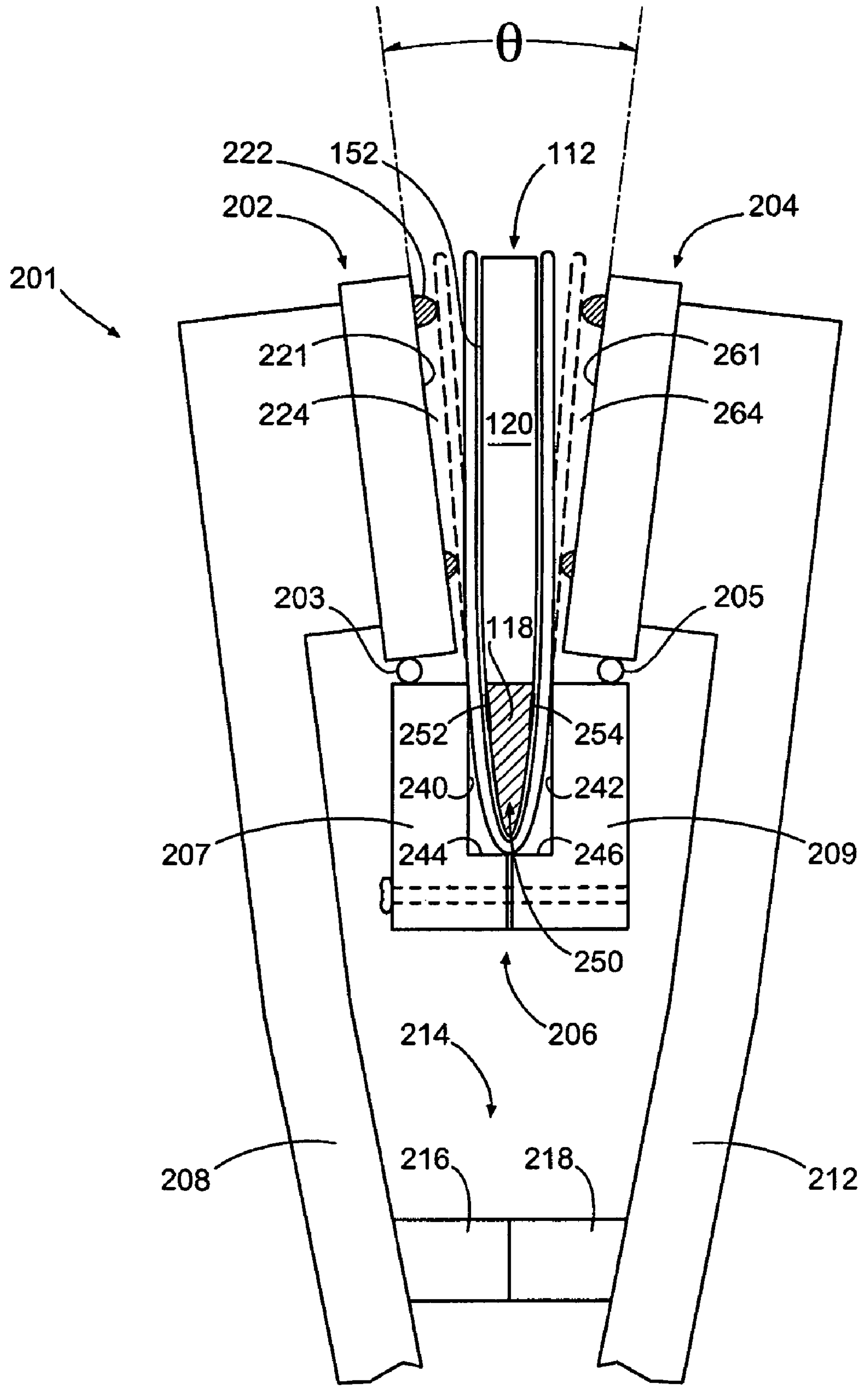
FIG. 5 is a schematic diagram depicting the embodiment of FIG. 3, showing engagement with a fairing sheath.

Operation of system 200 is depicted schematically in FIG. 5. As shown in FIG. 5, clamp 206 is positioned about a leading edge portion of fairing 112. Specifically, clamp 206 includes contact surfaces 240, 242 and locating surface 244, 246. The contact and locating surfaces of the clamp define a channel 250 in which the leading edge portion of the fairing sheath is positioned. So positioned, the contact surfaces of the clamp engage corresponding opposing surfaces of the exterior of the fairing sheath, while the locating surfaces tend to axially align tool 201 and fairing sheath 112. Notably, positioning of the leading edge portion within channel 250 tends to restrict movement of the leading edge portion within the channel. In some embodiments, this may tend to prevent damage to components that may not be resistant to tensile loads, which may otherwise occur during repositioning of the fairing sheath. By way of example, electrical connections 252 and 254, located between the fairing sheath and locating component can be secured between the contact surfaces of the clamp 206. During repositioning of the fairing sheath, the clamp should reduce movement of the fairing sheath relative to components 252 and 254 preventing tensile forces from generating electrical shorts and/or structural damage between the fairing sheath and locating component.

After the leading edge portion of the fairing sheath is positioned within channel 250 and the clamp members are adequately biased together, the contact faces 221, 261 of the gripping members are moved to positions that enable vacuum seals to be formed with the exterior of the fairing sheath. Moving of the contact faces involves positioning the handles until the corresponding seals of the gripping members contact the exterior of the fairing sheath. Vacuum pressure is then applied to the vacuum chambers 224, 264. Thereafter, movement of the gripping members away from each other by pivoting the contact faces about the hinges deforms the fairing sheath (depicted by dashed lines).

Movement of the gripping members in the aforementioned manner is accomplished by positioning the handles. Such movement is restricted by stops 216, 218, which contact each other at a limit position. Although varying depending upon the physical characteristics of the fairing sheath, the limit position can correspond to the contact faces of the gripping members exhibiting an included angle (θ) of between approximately 4 and approximately 10 degrees, preferably between approximately 5 and approximately 7 degrees. The minimum angle being determined by the clearance necessary to install the fairing (116) over the inner strut (120) without disturbing the uncured adhesive material (152) in the process. The maximum angle being determined by the stress limits of the sheath material and/or strength of the interface between fairing (116) and locating feature (118). Regardless of the location of the limit position, movement of the gripping members and fairing sheath should provide adequate clearance between the fairing sheath and other components of the fairing thereby enabling removal and/or installation of the fairing sheath.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A system for positioning a fairing sheath of a gas turbine engine comprising:

a tool having a clamp and opposing gripping members;

the clamp having a first clamping surface and a second clamping surface that are operative to clamp onto a leading edge portion of a fairing sheath; and the gripping members being operative to pivot about the clamp, a first of the gripping members having a first contact face and a first seal positioned on the first contact face, a second of the gripping members having a second contact face and a second seal positioned on the second contact face, the first contact face opposing the second contact face, the first contact face and the first seal being operative to form a first vacuum chamber, the second contact face and the second seal being operative to form a second vacuum chamber;

wherein a slot is formed between the first contact face and the second contact face, and extends into the clamp between the first clamping surface and the second clamping surface.

2. The system of claim 1, wherein:

the clamp has a first clamp member that includes the first clamping surface, and a second clamp member that includes the second clamping surface; and a portion of the slot between the first clamping surface and the second clamping surface defines a channel sized and shaped to receive a leading edge portion of a fairing sheath therein.

3. The system of claim 2, wherein:

the first clamp member further comprises a first locating surface that is operative to contact a surface of the fairing sheath such that a longitudinal position of the first contact surface of the first gripping member is established; and the second clamp member further comprises a second locating surface that is operative to contact a surface of a fairing sheath such that a longitudinal position of the second contact surface of the second gripping member is established.

4. The system of claim 3, wherein:

the first clamping surface is located between the first locating surface and the first contact surface; and the second clamping surface is located between the second locating surface and the second contact surface.

5. The system of claim 1, further comprising a first handle extending from the first of the gripping members and a second handle extending from the second of the gripping members such that positioning of the handles positions the gripping members.

6. The system of claim 5, further comprising a stop operative to prevent movement of the first handle and the second handle beyond a limit position at which damage to the fairing sheath could occur.

7. The system of claim 6, wherein the stop comprises a first stop member positioned on the first handle and a second stop member positioned on the second handle, the first stop member and the second stop member being operative to contact each other at the limit position.

8. The system of claim 6, wherein, at the limit position, the first contact surface and the second contact surface define an included angle of between approximately 4 and approximately 10 degrees.

9. The system of claim 6, wherein, at the limit position, the first contact surface and the second contact surface define an included angle of between approximately 5 and approximately 7 degrees.

10. The system of claim 1, further comprising a vacuum pressure source pneumatically communicating with the first of the gripping members and a second of the gripping members such that vacuum pressure is applied to the first vacuum chamber and to the second vacuum chamber.

11. The system of claim 1, wherein the first seal extends along a major axis having a length corresponding to a length of the fairing sheath.

12. The system of claim 11, wherein the clamp extends along a major axis having a length corresponding to the length of the first seal.

13. The system of claim 1, wherein the gripping members pivot about respective axes oriented parallel to a leading edge of the fairing.

14. A method for positioning a fairing sheath of a gas turbine engine utilizing a tool with a slot, comprising:

receiving the fairing sheath within the slot;

connecting the tool to opposing portions of the fairing sheath with vacuum pressure; and moving the opposing portions of the fairing sheath away from each other by manipulating the tool.

15. The method of claim 14, wherein connecting of the tool includes forming a first vacuum seal between the tool and first portion of the fairing sheath, and forming a second vacuum seal between the tool and a second portion of the fairing sheath; and moving of the opposing portions includes moving the first vacuum seal away from the second vacuum seal.

16. The method of claim 15, wherein moving the first vacuum seal away from the second vacuum seal comprises pivoting the first vacuum seal and the second vacuum seal.

17. The method of claim 15, further comprising restricting movement of a portion of the fairing sheath during the moving.

18. The method of claim 17, wherein restricting movement comprises clamping a leading edge portion of the fairing sheath during the moving.

19. The method of claim 14, further comprising installing the fairing sheath in the gas turbine engine.

20. The method of claim 14, further comprising removing the fairing sheath from the gas turbine engine.

* * * * *